Patented Apr. 1, 1952

2,591,625

UNITED STATES PATENT OFFICE 2,591,625

METHOD OF RUSTPROOFING AND USING CONCRETE REINFORCING ELEMENTS

Hans Lennart Simonsson, Stockholm, and Torsten Leo Ulfstedt, Sodertalje, Sweden, assignors to Internationella Siporex Aktiebolaget, Stockholm, Sweden, a company of Sweden No Drawing. Application November 1, 1948, Serial No. 57,824. In Sweden November 3, 1947

11 Claims. (Cl. 25—154)

This invention relates to manufacture of rustproofed reinforcing elements for concrete and it comprises a process of forming an elastic, rustinhibitive coating on metal reinforcing elements composed of a mixture of hydraulic cement and a small proportion of a hydrophilic organic colloidal binding material which at least swells in water and drying the coating, usually by an accelerated drying method, before the reinforcing elements are cast into concrete. In addition the invention includes the metal reinforcing elements coated in the manner described; said coating being adherent to the steel reinforcement and capable of uniting with concrete during setting of the latter; as well as the reinforced concrete structure produced by causing a grout of hydraulic cement to set about the coated reinforcing elements; all as more fully hereinafter set forth and as claimed.

One of the objects of this invention is to provide a coating for iron and steel reinforcing elements for concrete which will be rust-inhibitive, which will adhere to steel and unite with cement and will be sufficiently elastic to maintain a tight joint regardless of expansion and contraction caused by temperature changes.

A further object of this invention is to produce an adherent, rust-inhibitive coating for metal reinforcing elements for concrete containing a hydraulic cement and having as the adhering agent therein a hydrophilic binding material which at least swells in water.

Another object of the invention is to provide a cementitious coating on reinforcing elements which can be dried rapidly by one of the conventional accelerated drying methods, such as radiant heat, hot air or the like, before setting; final setting of the cement in the coating taking place after the elements have been embedded in the grout of a hydralic cement.

A still further object of this invention is to produce as an article of manufacture, a steel reinforcing element for concrete having an adherent rust-inhibitive coating thereon containing a hydraulic cement and, as the adhering agent, a hydrophilic material which at least swells in water, which coating will not crack or chip off during handling or transportation of the reinforcing elements and which will set and unite with a grout of hydraulic cement.

One of the major problems connected with the use of reinforced concrete is the rusting of the reinforcing elements with consequent weakening of the structure. This rusting results from moisture coming in contact with the reinforcing element through the joints between the reinforcing elements and the surrounding concrete, which joints have been weakened by repeated expansion and contraction caused by temperature change. It is well known that the union between concrete and metal will not in itself long withstand weathering with exposure to atmospheric temperature changes.

It has been previously suggested to pre-coat reinforcing elements with various water-repellent coatings, such as asphalt, which afford some protection from moisture entering through the joints between the elements and the concrete. But it is obvious, of course, that an asphalt or other coating containing a hydrophobic material cannot unite with the concrete to form a tight joint.

The requirements to be met by a satisfactory coating composition for reinforcing rods are, of course, very strict. The coating should adhere tightly to the metal rod indefinitely and under all conditions of temperature and weathering. It should also unite with or key into the concrete with formation of a joint which remains tight under all conditions. It should be sufficiently elastic and tough so it will not chip off the metal reinforcement during handling and transportation and after the rods are embedded in concrete, so that it will withstand severe changes in temperature without cracking or separating from either the metal or the concrete. And the coating should either be water-proof or should be capable of preventing corrosion of iron even in the presence of moisture. Since the temperature coefficients of expansion of concrete and of metal differ rather widely, this increases the difficulties of finding a suitable material.

We have found that the above and other objects can be accomplished and the enumerated difficulties overcome by using a coating composition which contains in addition to a hydraulic cement a small proportion of a hydrophilic colloidal binding material which dissolves or at least swells in water.

We have found that the bulk of this coating composition should be formed from a hydraulic cement, preferably the same cement as that in which the coated reinforcing elements will eventually be embedded. The presence of this cement insures an expansion coefficient that corresponds substantially to that of the concrete and it insures a union between the cementitious coating and the concrete into which the reinforcing elements are cast. The function of the hydrophilic binding material is more complex. It undoubtedly renders the coating tacky and flexible which, of course, is of great importance in that the coating is capable of adhering to both the metal and the concrete without separating from either in spite of expansions and contractions due to temperature change. The hydrophilic binding agent also retards the setting of the cement so that final setting occurs only after the coated rods are embedded in the concrete. This binding agent also effectively prevents the coating from becoming brittle when dried. We have found, for example, that a cementitious coating without the binding agent soon becomes brittle and powdery. It will not withstand handling or transportation.

In order to prevent brittleness in such a coating we have found that it requires the presence of e. g. about 5 per cent of a hydrophilic organic colloidal binding agent, based on the weight of the hydraulic cement. While the upper limit of binding agent depends upon various factors and differs somewhat with the type of cement used, we have found that a practical upper limit is reached when about 25 per cent of the binding agent is incorporated in the composition.

We have found that when reinforcing elements coated with our coating composition are embedded in concrete and subjected to conditions simulating the weather conditions to which ordinary concrete is subjected, they show no signs of rusting after long periods of exposure. We have also found that articles coated with our coating composition may be shipped and handled without any chipping of the coating.

One important advantage of our process resides in the fact that drying of our coating can be carried out rapidly without damaging the properties of the protective film, for example, by employing a raised temperature, or by the application of radiant heat or hot air or the like, thus rendering the process economical from the point of view of saving time. When our coating is dried it constitutes what is essentially a flexible coating of cement which is reactive with water.

The final setting and hardening of our protective coating which take place after the coated reinforcing elements have been cast in position greatly enhance the properties of the coating. This is particularly true in connection with steam-hardening. The final hardened coating has the appearance, strength, and rust-inhibitive properties that a coat of pure cement would have, together with the added advantages that it adheres to both iron and concrete, it does not chip off in handling and it is sufficiently plastic to conform to the expansion and contraction of the surrounding concrete.

Among the materials which we have found suitable for the hydrophilic organic colloidal binding agent in the practice of our invention are collagen containing agents such as bone glue, gelatine and the like, albuminous substances such as albumen, casein and others, cellulose ethers such as methyl cellulose and other esters and ethers of cellulose which are hydrophilic and which swell in water, starch pastes, etc. In fact we have found that any material which can be called a hydrophilic organic colloidal binding agent which at least swells in water, i. e. which either swells or partly dissolves in water as a colloidal solution, can be employed in our process of coating reinforcing elements.

As the hydraulic cement compound of our coating composition we may use Portland cement, "Ciment Fondu," a slow-setting hydraulic cement containing lime, alumina and silica, calcium aluminate cements and other hydraulic cements. It is usually advantageous to employ on the reinforcing elements a coating of the same cement in which the elements are to be subsequently cast. But our process is particularly suitable for use in making reinforcing elements for porous pumice concretes. These concretes do not possess the rust-inhibitive properties of Portland cement, for example, and hence in the reinforcement of these concretes it is advisable to employ coatings of Portland or some other cement having natural corrosion-inhibiting properties.

In one modification of our invention we may add to the aqueous cement grout used for the production of our protective film various finely divided solid constituents with or without a rust-inhibitive effect, such as lime, kaolin and sand. The protective effect of the film produced according to the invention may be further improved by the addition of one of the conventional corrosion-inhibiting agents, such as an alkali-metal chromate. These agents may be added in solid form in excess of the saturation point of the water employed for producing the grout but many are sufficiently soluble so that they can be dissolved in the water used in making the grout coating composition.

Our invention can be explained in greater detail by reference to the following specific examples which represent practical operating embodiments of our process as used in the production of our coated reinforcing elements.

*Example 1*

| | Parts |
|---|---|
| Portland cement | 100 |
| Water | 50 |
| Gelatine | 10 |

The above coating composition was prepared by first mixing together the bulk of the water and cement and then mixing in a solution of the gelatine formed by heating the latter in approximately the minimum quantity of water required for its dissolution. Sufficient water was then added to produce a grout coating composition having substantially the consistency of a thick paint. Steel rods were coated with the resulting grout by a dipping procedure. The coating thus formed was found to have a thickness of about 0.05 inch. The coating was dried by exposing it to a current of air heated to a temperature of about 30° C. After drying the coating was found to be elastic and firmly adherent to the steel and also resistant to chipping. The cement in the coating was unset. When these coated rods were cast in a grout of Portland cement it was found that the coating united with the concrete during setting and that the rods were effectively protected from corrosion. The joints between the reinforcing rods and the concrete remained tight over an extended weathering period.

*Example 2*

| | Parts |
|---|---|
| "Ciment Fondu" | 100 |
| Water | 40 |
| Starch | 10 |

The above composition was prepared by adding the starch in the form of a prepared aqueous paste to the cement grout and adding water until the composition had about the consistency of a thick paint. This composition was applied in a rather thick coating to iron reinforcing rods by means of a brush. The coating was dried by socalled radiant heating in a period of about 2 hours and, after drying, was found to be firmly adherent and resistant to mechanical injury. These coated rods were found to be resistant to corrosion when cast in concrete and they formed tight joints with the concrete.

*Example 3*

| | Parts |
|---|---|
| Portland cement | 100 |
| Water | 40 |
| Methyl cellulose | 5 |

To form this composition an aqueous dispersion of the methyl cellulose was first prepared and then mixed with the cement grout. Coating was accomplished as in Example 1. The coating was found to be firmly adherent to the reinforcing rods and to form tight joints with concrete.

*Example 4*

| | Parts |
|---|---|
| Portland cement | 70 |
| Water | 30 |
| Bone glue | 10 |
| Fine sand | 30 |

This composition was prepared and applied to steel reinforcing rods as described in Example 1, the sand being mixed with the cement before water was added. The coating was found to be firmly adherent to the rods and to unite firmly with concrete when the coated rods were cast therein.

*Example 5*

| | Parts |
|---|---|
| Portland cement | 80 |
| Water | 40 |
| Casein | 8 |
| Sodium chromate | 2 |
| Kaolin | 20 |

In preparing this composition the sodium chromate in solid form and the kaolin were mixed with the cement before water was added. The casein was then added in the form of an aqueous alkaline dispersion. The resulting grout coating composition was applied to steel reinforcement by spraying, followed by air drying, and it was found that the coating provided excellent protection against corrosion.

The coating compositions of our invention are suitable for the treatment of all types of metal reinforcing elements but are especially suitable for the treatment of reinforcing steel and iron elements of all types, shapes and sizes. Our process is particularly useful in the making of building blocks and other structural elements which are hardened to autoclaves.

Our protective coating can be applied by dipping, brushing, spraying or other methods. If desired the freshly applied coating can be dusted with dry cement. This expedites drying of the coating and shortens the time between the coating operation and the time when the coating can be handled without injury.

While various embodiments of our invention have been hereinabove indicated, it will be understood that the invention of this application is not limited to the specific examples herein recited but that numerous modifications and variations thereof may be made without departing from the principles of our invention.

What we claim is:

1. The method of rust-proofing iron and steel reinforcing elements for concrete which comprises coating such elements with a liquid slurry of a hydraulic cement containing a small proportion of a hydrophilic organic colloidal binding material which at least swells in water in amount sufficient to retard the setting of the composition, to render the coating flexible and to produce a binding action in the coating, and drying the coating before the hydraulic cement has fully set, whereby the coating remains reactive with water and unites with the concrete in which the coated reinforcing elements are eventually employed.

2. In the making of reinforced concrete wherein rust-proofed steel and iron reinforcing elements are employed, the process which comprises coating the reinforcing elements with a hydraulic cement liquid slurry containing from about 5 to 25 per cent of a hydrophilic organic colloidal binding material which at least swells in water and retards the setting of the composition, drying the coating before setting takes place, and surrounding the reinforcing elements with a hydraulic cement grout, whereby the cement coating on the reinforcing elements sets and unites with the concrete during setting thereof, producing tight water-proof tough joints between the reinforcing elements and the concrete.

3. The process of claim 2 wherein the concrete is steam cured.

4. The process of claim 2 wherein the cement coating on the reinforcing elements is dried by the application of heated air.

5. The process of claim 2 wherein the cement slurry used for coating the reinforcing elements contains an alkali metal chromate as a rust-proofing agent.

6. The process of claim 2 wherein the colloidal binding material is casein.

7. In the making of reinforced concrete wherein rust-proofed iron and steel reinforcing elements are employed, the process which comprises coating the reinforcing elements with a slurry of Portland cement containing a small proportion of casein sufficient to retard the setting of the composition, to render the coating flexible and to produce a binding action in the coating, drying the coating before it has set, embedding the so-coated reinforcing elements in a grout of Portland cement and steam curing the cement, whereby a reinforced concrete is produced with water-tight tough joints between the reinforcing elements and the concrete.

8. In the making of reinforced concrete wherein rust-proofed iron and steel reinforcing elements are employed, the process which comprises coating reinforcing elements with a slurry of Portland cement containing sufficient casein to retard the setting of the composition, to render the coating flexible and to produce a binding action in the coating and sufficient sodium chromate to act as a rust inhibitor, drying the coated reinforcing elements before the cement has set, embedding the so-coated reinforcing elements in an unset concrete and curing the concrete, whereby tight joints are formed between the reinforcing elements and the concrete.

9. The method of rust-proofing iron and steel reinforcing elements for concrete which comprises coating such elements with a thin coating of a slurry of a hydraulic cement containing from about 5 to 25 per cent of a hydrophilic organic colloidal binding material which at least swells in water and retards the setting of the composition, and drying the said coating before it has had time to set, whereby a rust-proofing coating is obtained which is tough and chip-proof and capable of setting when the coated reinforcing elements are embedded in a hydraulic cement slurry.

10. The process of claim 2 wherein the colloidal binding material is methyl cellulose.

11. In the making of reinforced concrete wherein rust-proofed iron and steel reinforcing elements are employed, the process which comprises coating such reinforcing elements with a thin coating of a slurry of a hydraulic cement containing from about 5 to 25 percent of a hydrophilic organic colloidal binding material which at least swells in water and retards the setting of the composition, drying the coating before it has had time to set, then casting a hydraulic cement compositon around said reinforcing elements and steam curing to cause setting of the said coating as well as setting of the cement, whereby the said coating unites with the cement forming a tough water-proof joint.

HANS LENNART SIMONSSON.
ULFSTEDT, TORSTEN LEO.

REFERENCES CITED

The following references are of record in the file of this patent:

UNITED STATES PATENTS

| Number | Name | Date |
|---|---|---|
| 2,105,324 | Huttemann et al. | Jan. 11, 1938 |
| 2,339,163 | Friedlaender | Jan. 11, 1944 |